United States Patent
Rampal et al.

(10) Patent No.: US 9,444,728 B2
(45) Date of Patent: Sep. 13, 2016

(54) PACKET SWITCHING DEVICE INCLUDING CASCADED AGGREGATION NODES

(71) Applicants: Sanjeev Debdutta Rampal, Cary, NC (US); Dezhong Cai, San Jose, CA (US); Praveen Bhagwatula, Cary, NC (US)

(72) Inventors: Sanjeev Debdutta Rampal, Cary, NC (US); Dezhong Cai, San Jose, CA (US); Praveen Bhagwatula, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 13/954,138

(22) Filed: Jul. 30, 2013

(65) Prior Publication Data

US 2015/0036484 A1 Feb. 5, 2015

(51) Int. Cl.
*H04L 12/703* (2013.01)
*H04L 12/721* (2013.01)
*H04L 12/701* (2013.01)
*H04L 12/751* (2013.01)
*H04L 12/947* (2013.01)

(52) U.S. Cl.
CPC .............. *H04L 45/28* (2013.01); *H04L 45/44* (2013.01); *H04L 45/00* (2013.01); *H04L 45/02* (2013.01); *H04L 45/12* (2013.01); *H04L 49/25* (2013.01)

(58) Field of Classification Search
CPC ....... H04L 45/02; H04L 45/24; H04L 45/38; H04L 45/58
USPC .................. 370/389, 400, 218, 225
See application file for complete search history.

(56) References Cited

U.S. PATENT DOCUMENTS

| | | | |
|---|---|---|---|
| 6,856,591 B1* | 2/2005 | Ma .................. | H04L 41/0631 370/216 |
| 7,568,040 B2 | 7/2009 | Townsley et al. | |
| 8,078,721 B2 | 12/2011 | Droms et al. | |
| 2006/0101157 A1* | 5/2006 | Eardley .................. | 709/239 |
| 2007/0053385 A1* | 3/2007 | Tollbom .............. | H04L 43/026 370/537 |
| 2008/0107017 A1* | 5/2008 | Yuan .................. | H04L 41/0663 370/228 |
| 2009/0190522 A1* | 7/2009 | Horn .................... | H04W 40/30 370/315 |
| 2010/0085969 A1* | 4/2010 | Aoki et al. .................. | 370/392 |
| 2013/0083691 A1* | 4/2013 | Murphy .............. | H04W 12/06 370/254 |
| 2013/0103852 A1* | 4/2013 | Jung .................... | H04L 69/161 709/236 |

OTHER PUBLICATIONS

R. Droms, "Dynamic Host Configuration Protocol," RFC 2131, The Internet Society, Reston, VA, USA, Mar. 1997 (forty-five pages).

(Continued)

*Primary Examiner* — Habte Mered
*Assistant Examiner* — Rownak Islam
(74) *Attorney, Agent, or Firm* — The Law Office of Kirk D. Williams (57) ABSTRACT

In one embodiment, a packet switching device includes one or more host devices and a cascade of aggregation nodes. The aggregation nodes aggregate customer traffic and communicate it with the host device. Typically the aggregation nodes are remotely located from the host device. The host device may be connected to one or both ends of the cascaded topology of aggregation nodes. In one embodiment, the cascaded topology of aggregation nodes automatically configures itself using initiation packets. In one embodiment, the cascaded topology of aggregation nodes reacts to detected faults, such as by changing direction packet traffic is sent through the cascaded topology. By cascading aggregation nodes, in contrast to having each aggregation node connected to the host device via one or more point-to-point links, communications costs are decreased in one embodiment.

11 Claims, 5 Drawing Sheets

(56) References Cited

OTHER PUBLICATIONS

Cheshire et al., "Dynamic Configuration of IPv4 Link-Local Addresses," RFC 3927, The Internet Society, Reston, VA, USA, May 2005 (thirty-three pages).

"Configuring the Satellite Network Virtualization (nV) System on the Cisco ASR 9000 Series Router," Cisco Systems, Inc., San Jose, CA, USA, Copyright 2010-2012 (twenty-six pages).

* cited by examiner

PACKET SWITCHING DEVICE INCLUDING CASCADED AGGREGATION NODES

TECHNICAL FIELD

The present disclosure relates generally to forwarding packets in a communications network, including by a packet switching device including cascaded aggregation nodes.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Packet switching devices are deployed in a network to receive packet traffic (e.g., customer traffic) directly from end user devices or from another network. Packet switching devices may operate at different protocol layers, such as, but not limited to, packet switching performed by layer-3 routers or layer-2 bridges.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with a packet switching device including one or more host devices and a cascade of aggregation nodes. One embodiment includes an apparatus, comprising: a first host device and a plurality of cascaded aggregation nodes. A plurality of network links communicatively couple the plurality of cascaded aggregation nodes adjacent to form a cascaded topology, which is communicatively coupled to the first host device.

In one embodiment, the apparatus is configured to operate as a first packet switching device, including the first host device and one or more of the plurality of aggregation nodes. In one embodiment, at least one of the plurality of cascaded aggregation nodes is located remotely from the first host device. In one embodiment, the apparatus operates as a single logical device (e.g., that can be managed as a single device, in contrast to a collection of individually managed devices; and appears to other switches and devices as a single switch, such as for routing protocol purposes). In one embodiment, these devices automatically discover and form the single logical device (e.g., without any external controller).

In one embodiment, the first host device is communicatively coupled to only one end of the cascaded topology of the plurality of cascaded aggregation nodes. In one embodiment, the first host device is communicatively coupled to each end of the cascaded topology of the plurality of cascaded aggregation nodes. In one embodiment, one or more of the plurality of cascaded aggregation nodes is configured to switch direction of communication with the first host device through the cascaded topology of the plurality of cascaded aggregation nodes in response to a communications fault within cascaded topology.

One embodiment includes a second host device; and wherein the apparatus is configured to operate as two packet switching devices including the first packet switching device and a second packet switching device, with the second packet switching device including the second host device and one or more of the plurality of aggregation nodes. In one embodiment, one or more of the plurality of cascaded aggregation nodes is configured to switch from communicating with the first host device to communicating with the second host device or from communicating with the second host device to communicating with the first host device in response to a communications fault within in the cascaded topology of the plurality of cascaded aggregation nodes. In one embodiment, at least one of the plurality of cascaded aggregation nodes is located remotely from both the first and second host devices.

In one embodiment, the plurality of cascaded aggregation nodes is configured to automatically form the cascaded topology. In one embodiment, the plurality of cascaded aggregation nodes is configured to automatically not use one or more communications links coupling two non-adjacent nodes of the cascaded topology of the plurality of cascaded aggregation nodes (e.g., not to use a links that are not properly wired).

2. Description

Disclosed are, inter alia, methods, apparatus, computer-storage media, mechanisms, and means associated with a packet switching device including one or more host devices and a cascade of aggregation nodes. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The teen "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value— the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes an apparatus, comprising: a first host device; a plurality of cascaded aggregation nodes; and a plurality of network links communicatively coupling the plurality of cascaded aggregation nodes to adjacent other one or more nodes of the plurality of cascaded aggregation nodes to form a cascaded topology, and communicatively coupling the plurality of cascaded aggregation nodes to the first host device; wherein the apparatus is configured to operate as a first packet switching device including the first host device and one or more of the plurality of aggregation nodes.

In one embodiment, at least one of the plurality of cascaded aggregation nodes is located remotely from the first host device. In one embodiment, the first host device is communicatively coupled to only one end of the cascaded topology of the plurality of cascaded aggregation nodes. In one embodiment, the first host device is communicatively coupled to each end of the cascaded topology of the plurality of cascaded aggregation nodes. In one embodiment, one or more of the plurality of cascaded aggregation nodes is configured to switch direction of communication with the first host device through the cascaded topology of the plurality of cascaded aggregation nodes in response to a communications fault within the cascaded topology.

One embodiment includes a second host device; and wherein the apparatus is configured to operate as two packet switching devices including the first packet switching device and a second packet switching device, with the second packet switching device including the second host device and one or more of the plurality of aggregation nodes. In one embodiment, one or more of the plurality of cascaded aggregation nodes is configured to switch from communicating with the first host device to communicating with the second host device or from communicating with the second host device to communicating with the first host device in response to a communications fault in said cascaded topology of the plurality of cascaded aggregation nodes. In one embodiment, at least one of the plurality of cascaded aggregation nodes is located remotely from both the first and second host devices. In one embodiment, the plurality of cascaded aggregation nodes is configured to automatically form said cascaded topology based on an exchange of messages among the plurality of cascaded aggregation nodes. In one embodiment, the plurality of cascaded aggregation nodes is configured to automatically not use one or more communications links coupling two non-adjacent nodes of the cascaded topology of the plurality of cascaded aggregation nodes.

One embodiment includes a method, comprising: receiving, by a particular node of a plurality of cascaded aggregation nodes from a host device or adjacent node of the plurality of cascaded aggregation nodes arranged in a cascaded topology with an end node of the cascaded topology communicatively coupled to the host device, an initialization packet for configuring communication with the host device; appending an identification of the particular node to a path list within the initialization packet to create a next initialization packet; sending from the particular node the next initial packet to a next adjacent node of the plurality of cascaded aggregation nodes in a direction away from the host device; and establishing a communications session between the particular node and the host device over the path taken by the initialization packet from the host device to the particular node.

One embodiment further comprises: receiving, from another node of the plurality of cascaded aggregation nodes or the host device, a second initialization packet for configuring communication with the host device; and disregarding the second initialization packet by not establishing a second communications session between the particular node and the host device in response to determining that the second initialization packet corresponds to a path from the host device in the same direction from the host device.

In one embodiment, the host device is communicatively coupled to both ends of the cascaded topology; and wherein the method further comprises: receiving, from another node of the plurality of cascaded aggregation nodes or the host device, a second initialization packet for configuring communication with the host device; and in response to determining that the second initialization packet corresponds to a different direction path through the cascaded topology than the direction corresponding to the initialization packet, appending an identification of the particular node to a path list within the second initialization packet to create a next second initialization packet, sending from the particular node the next second initial packet towards the host device in the direction corresponding to the second initialization packet; and establishing a second communications session between the particular node and the host device through the path taken by the initialization packet from the host device to the particular node.

One embodiment further comprises: receiving, by the particular node from a second host device or second adjacent node of the plurality of cascaded aggregation nodes, a particular initialization packet for configuring communication with the second host device; appending an identification of the particular node to a path list within the particular initialization packet to create a next particular initialization packet; sending from the particular node the next particular initial packet to a next adjacent node of the plurality of cascaded aggregation nodes in a direction away from the second host device; and establishing a communications session between the particular node and the second host device. One embodiment further comprises selecting to communicate customer traffic packets with the host device and not the second host device. One embodiment further comprises switching to communicate customer traffic packets with the second host device and not the host device in response to a communications fault in cascaded topology. One embodiment further comprises receiving, by the particular node from another node of the plurality of cascaded aggregation nodes, a packet notifying the particular node of the communications fault within the cascaded topology. In one embodiment, the host device is communicatively coupled to each end of the cascaded topology of the plurality of cascaded aggregation nodes; and wherein the method includes switching to communicate customer traffic packets with the host device in a different direction through the cascaded topology in response to a communications fault in cascaded topology.

One embodiment includes a method, comprising: communicating, by a particular node of a plurality of cascaded aggregation nodes arranged in a cascaded topology with a first end node of the cascaded topology communicatively coupled to a first host device and a second end node of the cascaded topology communicatively coupled to a second host device, customer packet traffic to the first host device; and switching to communicate customer traffic packets with the second host device and stopping said communicating customer packet traffic to the first host device in response to a communications fault within cascaded topology.

One embodiment includes receiving, by the particular node from another node of the plurality of cascaded aggregation nodes, a packet notifying the particular node of the communications fault in the cascaded topology.

Figure 1A:
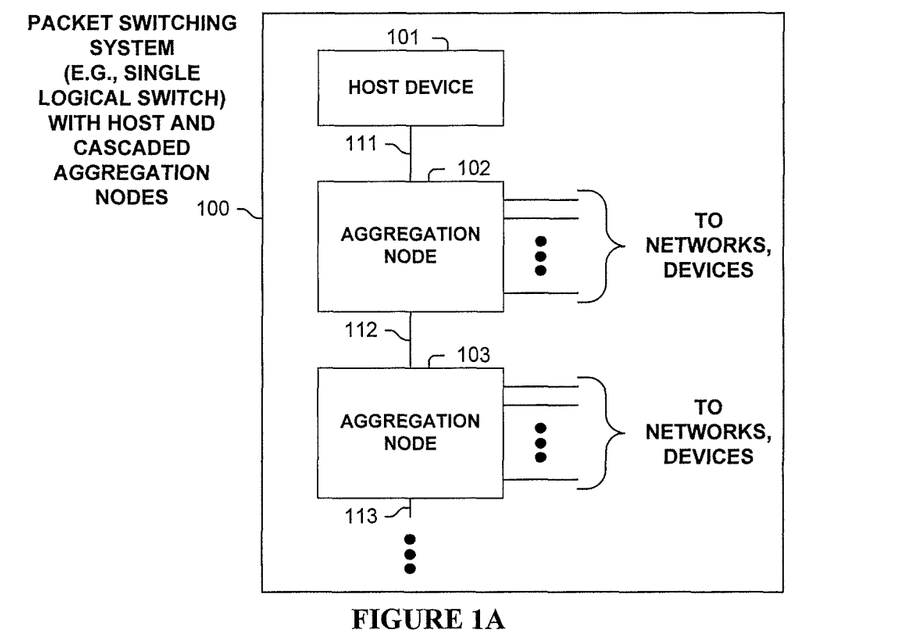
FIG. 1A illustrates an apparatus operating according to one embodiment.

Expressly turning to the figures, FIG. 1A illustrates packet switching system 100, that includes a host device 101 and multiple aggregation nodes 102-103, arranged in a cascaded topology using links 112 and 113. Cascaded topology of multiple aggregation nodes 102-103 is coupled to host device 101 via link 111. In one embodiment, one or more of links 111-113 are some speed of gigabit Ethernet links, either single links or combined into a bundle. In one embodiment, links are automatically bundled together as a single logical link during the auto-discovery process, when multiple links are discovered to traverse between two same devices (e.g., host device and an aggregation node, or two aggregation nodes).

In one embodiment, packet switching system 100 performs layer-2 packet switching. In one embodiment, packet switching system 100 performs layer-3 packet switching. In one embodiment, the packet switching system 100 operates as a single logical device (e.g., that can be managed as a single device, in contrast to a collection of individually managed devices; and appears to other switches and devices as a single switch, such as for routing protocol purposes).

Host device 101 and aggregation nodes 102-103 operate as a single packet switching device 101 (e.g., managed as a single package switching device, appear to other packet switching devices as a single packet switching device). Aggregation nodes 102-103 are typically remotely located from host device 101. As used herein, remotely located means in a different building. Aggregation nodes 102-103 are typically connected to network devices (e.g., packet switching devices of networks) to aggregate customer packet traffic (e.g., provide it to host device 101 and receive it from host device 101). In one embodiment, host device 101 performs the management of packet switching system 100, and packet switches packet traffic among its interfaces and among aggregation nodes 102-103.

By cascading aggregation nodes or using another topology other than dedicated point-to-point links, communications costs are decreased in one embodiment. However, there may be extra packet overhead as a packet transmitted between a host device and an aggregation node now includes a source and/or destination address of an aggregation node or host device. In one embodiment, a customer packet is encapsulated in a Mac-in-Mac packet format, including an outer destination address of an aggregation node or host device. Additionally, one embodiment may include any mix of one or more network topologies communicatively coupling aggregation nodes to a host devices, with the resulting system operating as a single packet switching device.

In the topology shown in FIG. 1A, there may be extra processing overhead by an aggregation node 102-103 as it is configured to receive and then forward packets not addressed to it. In one embodiment, aggregation nodes 102-103 do not communicate customer traffic to each other, other than relaying it to host device 101.

Figure 1B:
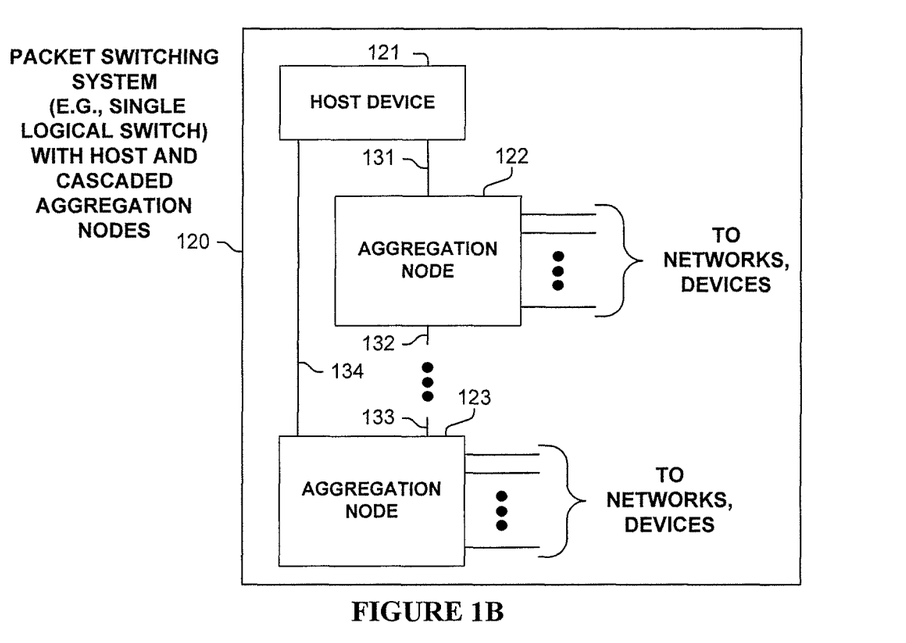
FIG. 1B illustrates an apparatus operating according to one embodiment.

FIG. 1B illustrates a packet switching system 120, that includes a host device 121 and multiple aggregation nodes 122-123, arranged in a cascaded topology using links 131-133. As shown, host device 121 is communicatively coupled to the cascaded topology of multiple aggregation nodes 122-123 via links 131 and 134, forming a ring topology. This provides two paths between an aggregation node 122-123 to host 121. In one embodiment, an aggregation node 122-123 selects which direction through the cascaded topology of multiple aggregation nodes 122-123 to send packets to host device 121 based on a random selection, predetermined/configured information, instructions from host device 121, shortest distance, and/or other metric. In one embodiment, the packet switching system 120 operates as a single logical device (e.g., that can be managed as a single device, in contrast to a collection of individually managed devices; and appears to other switches and devices as a single switch, such as for routing protocol purposes).

In one embodiment, in response to a fault detected in the cascaded topology of multiple aggregation nodes 122-123, an aggregation node will switch direction of sending traffic through the cascaded topology to avoid the fault. In one embodiment, a fault is propagated through the cascaded topology of multiple aggregation nodes 122-123 using a multicast or broadcast message so that each receiving multiple aggregation node 122-123 will process the fault message.

Figure 1C:
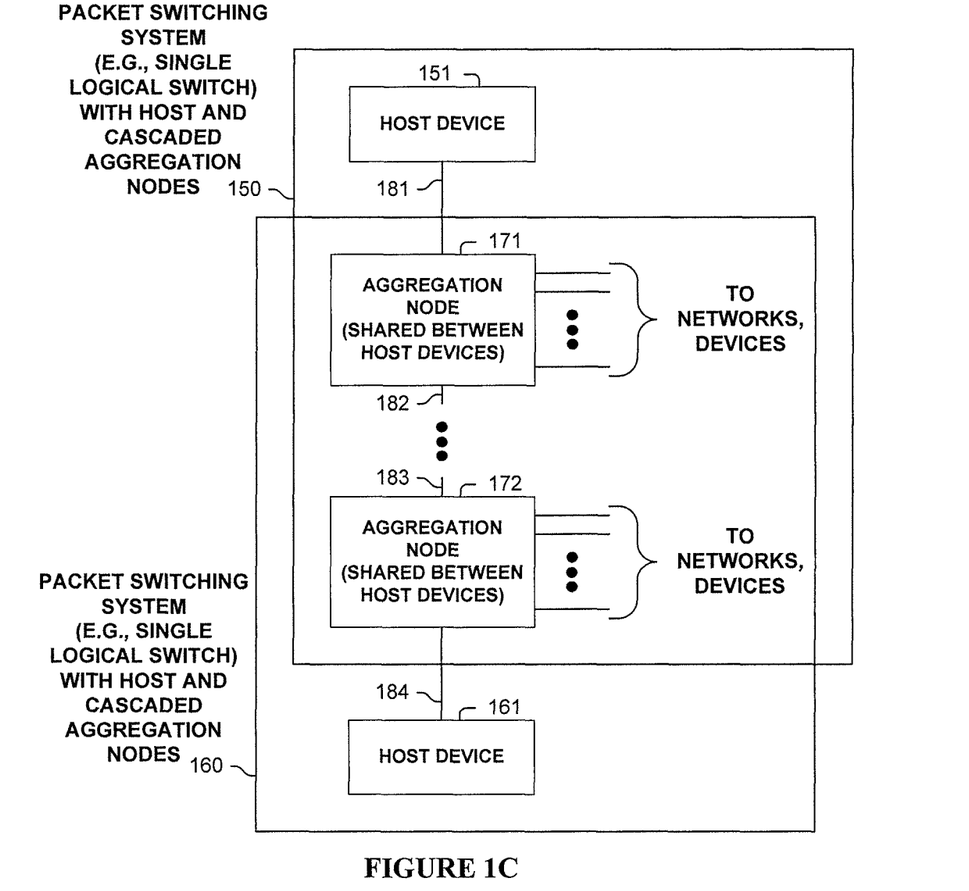
FIG. 1C illustrates an apparatus operating according to one embodiment.

FIG. 1C illustrates two packet switching systems 150 and 160, which share aggregation nodes 171-172 arranged in a cascaded topology using communications links 182-183. Packet switching system 150 includes host device 151 and one or more portions of or entire aggregation node(s) 171-172. Packet switching system 160 includes host device 161 and one or more portions of or entire aggregation node(s) 171-172. Host device 151 is communicatively coupled to cascaded topology of aggregation nodes 171-172 via link 181. Host device 161 is communicatively coupled to cascaded topology of aggregation nodes 171-172 via link 184. In one embodiment, each of packet switching systems 150 and 160 operates as a single logical device (e.g., that can be managed as a single device, in contrast to a collection of individually managed devices).

In one embodiment, an aggregation node 171-172 selects which host device 151, 161 to communicate with based on a random selection, predetermined/configured information, instructions from host device 151 and/or 161, shortest distance, and/or other metric. In one embodiment, host devices 151 and 161 synchronize state and negotiate with one another in determining which aggregation node 171-172 or portions thereof (e.g., on a line card or interface basis), should communicate with which host device 151 or 161. In one embodiment, this negotiation is automatically performed based on a selected policy (e.g., based on one or more characteristics, such as, but not limited to, closest, cost-basis, priority of traffic, traffic management/distribution).

In one embodiment, in response to a fault detected in the cascaded topology of multiple aggregation nodes 171-172, an aggregation node will switch host device 151, 161 and direction of sending traffic through the cascaded topology to avoid the fault. In one embodiment, a fault is propagated through the cascaded topology of multiple aggregation nodes 171-172 using an multicast or broadcast message so that each receiving multiple aggregation node 171-172 will process the fault message.

Figure 2A:
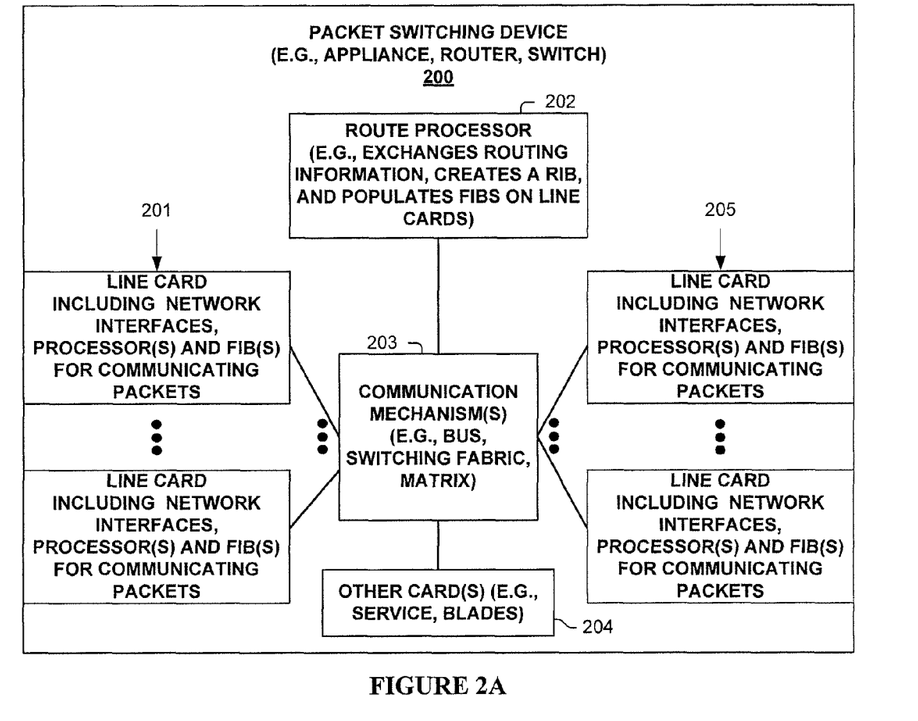
FIG. 2A illustrates a packet switching device according to one embodiment.

One embodiment of a packet switching device 200 is illustrated in FIG. 2A. In one embodiment, packet switching device 200 is a host device. In one embodiment, packet switching device 200 is an aggregation node (e.g., without the full route processing functionality).

As shown, packet switching device 200 includes multiple line cards 201 and 205, each with one or more network interfaces for sending and receiving packets over communications links (e.g., in a ring network after negotiating with adjacent packet switching device(s) as to which IP address to use on a corresponding interface), and with one or more processing elements that are used in one embodiment associated with a packet switching device including one or more host devices and a cascade of aggregation nodes. Packet switching device 200 also has a control plane with one or more processing elements 202 for managing the control plane and/or control plane processing of packets associated with a packet switching device including one or more host devices and a cascade of aggregation nodes. Packet switching device 200 also includes other cards 204 (e.g., service cards, blades) which include processing elements that are used in one embodiment to process packets associated with a packet switching device including one or more host devices and a cascade of aggregation nodes, and some communication mechanism 203 (e.g., bus, switching fabric, matrix) for allowing its different entities 201, 202, 204 and 205 to communicate.

Figure 2B:
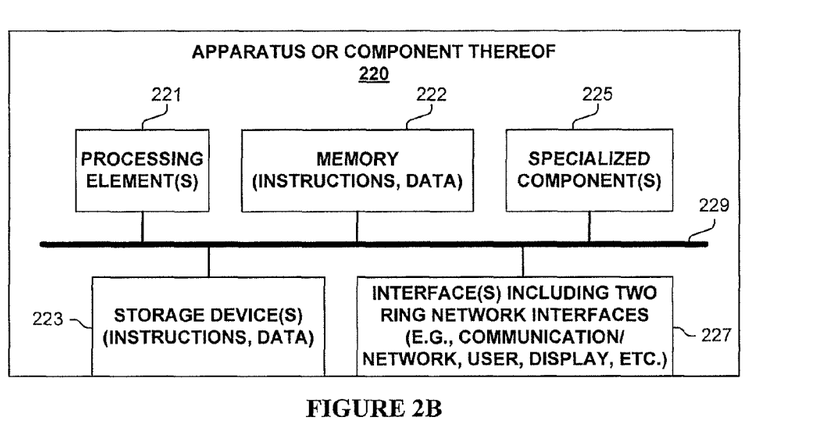
FIG. 2B illustrates an apparatus according to one embodiment.

FIG. 2B is a block diagram of an apparatus 220 used in one embodiment associated with a packet switching device including one or more host devices and a cascade of aggregation nodes. In one embodiment, apparatus 220 performs one or more processes, or portions thereof, corresponding to one of the flow, network, or other diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
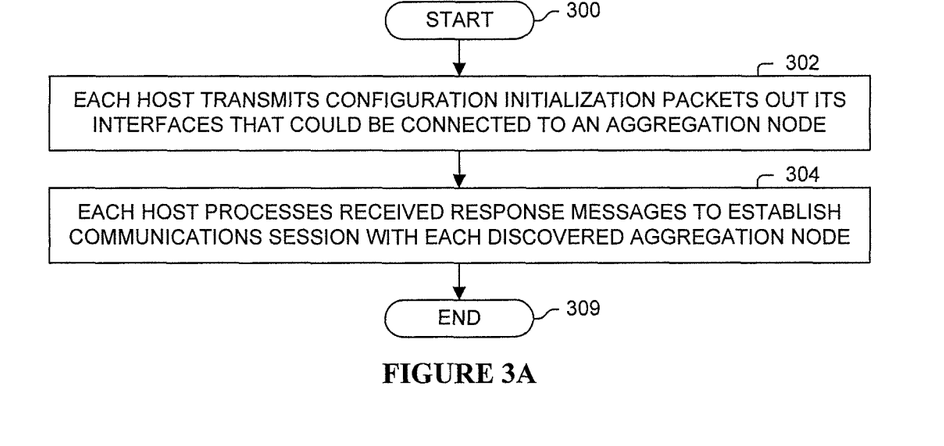
FIG. 3A illustrates process according to one embodiment.
Figure 3B:
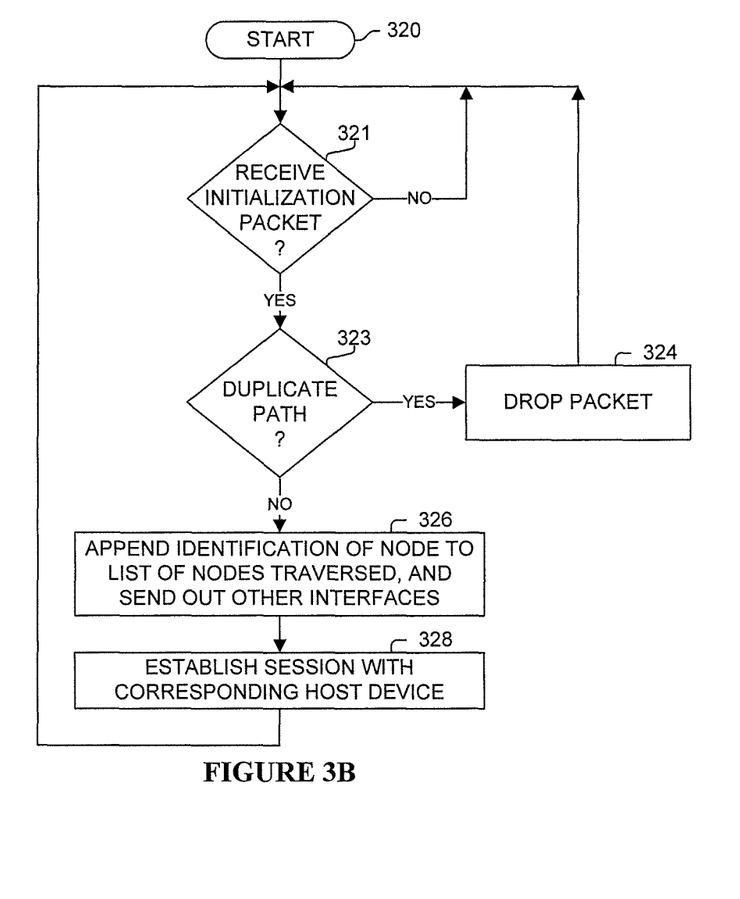
FIG. 3B illustrates process according to one embodiment.

FIG. 3A illustrates a process for a host device automatically discovering and configuring a packet switching system performed in one embodiment, which allows a host device to have minimal configuration information. In one embodiment, the host device(s) and aggregation node(s) automatically discover and form a single logical device (e.g., without any external controller) by exchanging protocol messages (e.g., including according to one or more of the process described in FIGS. 3A and B). This auto-discovery process allows there to be no or minimal configuration performed on an aggregation node. In one embodiment, an aggregation node is simply booted and based on the auto-discovery process, is configured to operate in conjunction one or more other aggregation nodes and a host device to form a single, logical packet switching device.

Processing of the flow diagram of FIG. 3A begins with process block 300. In process block 302, each host device of one or more host devices transmits a configuration initialization packet (e.g., including an initial traversal list of just the host device) out each of its interfaces, or just the interfaces that potentially are connected to an aggregation node. In process block 304, each host device processes received response messages and establishes a communications session with each discovered aggregation node. In one embodiment once a communications session is established, the host device communicates configuration information to the aggregation node, and begins exchanging customer packet traffic. Processing of the flow diagram of FIG. 3A is complete as indicated by process block 309.

FIG. 3B illustrates a process for automatically discovering and configuring a packet switching system performed in one embodiment by an aggregation node. Processing begins with process block 320. As determined in process block 321, when an initialization packet is received from a host device or other aggregation node, then processing proceeds to process block 323. Therein, a determination of whether or not the aggregation node has already received an initialization packet for (1) a path to that host device, or (2) an overlapping path in the case of a host device coupled to each end of the being configured cascade topology of aggregation nodes. If it is a duplicate path (e.g., such an initialization packet has been received), then in process block 324, the received initialization packet is dropped. Otherwise, in process block 326, an identification of the aggregation node is appended to the traversal list in the initialization packet, and it is sent out all of its other interfaces (or only those that could be connected to another aggregation node or host device). In process block 328, a communications session is established through the cascaded topology of aggregation nodes. In one embodiment once an aggregation node is in communication with the host device, the aggregation node receives configuration information and begins exchanging customer packet traffic with the host device. Processing of the flow diagram of FIG. 3B returns to process block 321.

Figure 4A:
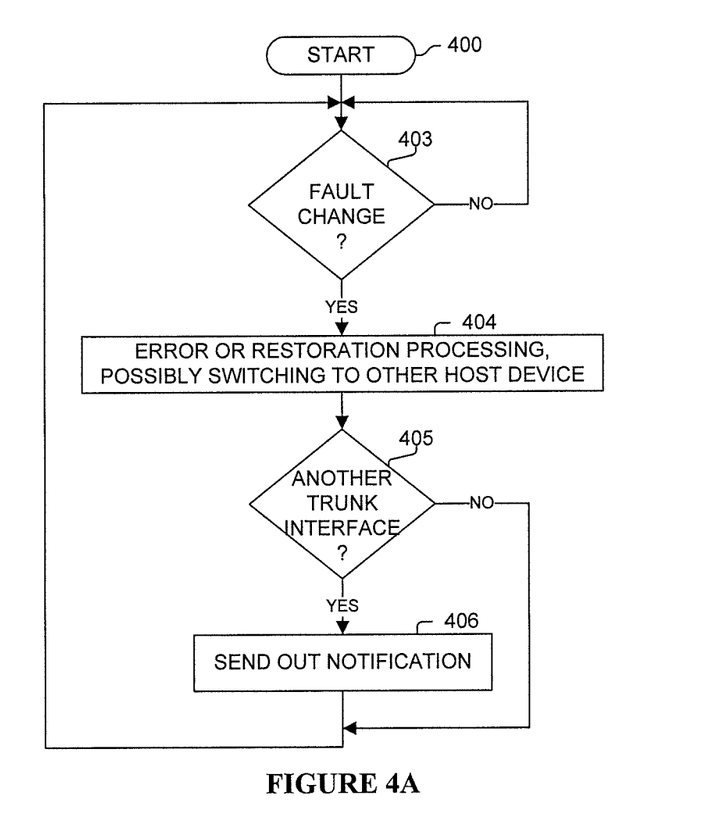
FIG. 4A illustrates process according to one embodiment.

FIG. 4A illustrates a process performed in one embodiment (e.g., by an aggregation node). Processing begins with process block 400. As determined in process block 403, when a fault change (e.g., new fault, old fault corrected) occurs (e.g., detected, notified in a packet), then in process block 404, error or restoration processing is performed. This processing may include switching directions through the cascade topology of aggregation nodes that customer traffic packets are sent, and/or to which host device customer traffic packets are sent. As determined in process block 405, if there is another interface participating in the cascaded topology, then a notification packet is sent out in process block 406. Processing returns to process block 403.

Figure 4B:
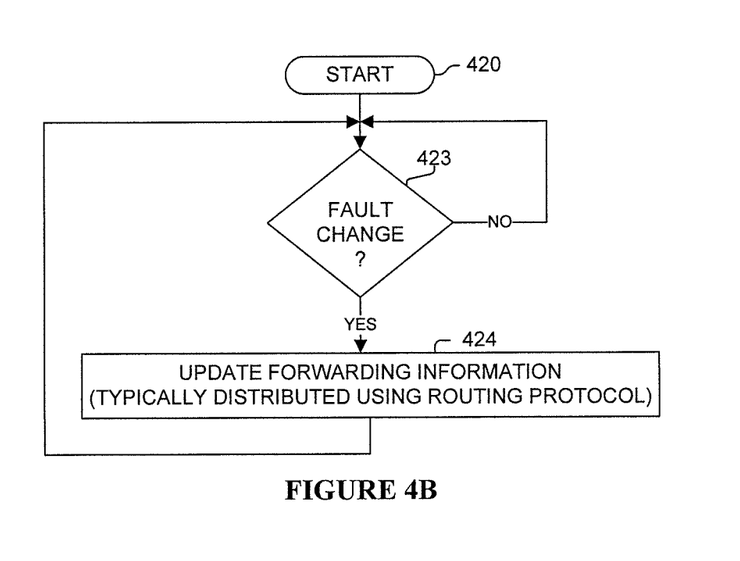
FIG. 4B illustrates process according to one embodiment.

FIG. 4B illustrates a process performed in one embodiment (e.g., by a host device). Processing begins with process block 420. As determined in process block 423, when a fault change (e.g., new fault, old fault corrected) occurs (e.g., detected, notified in a packet), then in process block 424, forwarding and/or routing information is updated, and this updated information is typically flooded throughout the network of which the packet switching system belongs. In one embodiment, a fault is propagated through the cascaded topology of multiple aggregation nodes using a multicast or broadcast message so that each receiving multiple aggregation node will process the fault message. Processing returns to process block 423.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

performing operations to automatically discover elements via a plurality of links and automatically configure a single logical packet switching device comprising said elements, with said elements including a first host device and a plurality of cascaded aggregation nodes, with each of the plurality of aggregation nodes connected to customer network devices, and with the plurality of network links communicatively coupling the plurality of cascaded aggregation nodes to adjacent other one or more nodes of the plurality of cascaded aggregation nodes to form a cascaded topology with an end node of the plurality of aggregation nodes of the cascaded topology directly coupled to the first host device, and with the cascaded topology of the plurality of aggregation nodes communicatively coupling each of the plurality of cascaded aggregation nodes to the first host device; wherein the single logical packet switching device is represented to external devices as a single packet switching device in contrast to multiple devices (a) for management purposes, and (b) for switching or routing purposes; and wherein said operations include:

for each particular node of the plurality of cascaded aggregation nodes: said particular node receiving an initialization packet originated by the first host device from the first host device or an adjacent node of the plurality of cascaded aggregation nodes; and in response to determining that the initialization did not come over a duplicate path from the first host device establishing a communications session between the particular node and the first host device over a path taken by the initialization packet from the first host device to the particular node; and each of the plurality of aggregation nodes receiving customer packet traffic from at least one of said customer network devices and forwarding said customer packet traffic to the first host device over said established communications session, with the first host device then forwarding said customer traffic over a said established communications session to a corresponding one of the plurality of cascaded aggregation nodes which then forwards to one of said customer network devices.

2. The method of claim 1, wherein at least one of the plurality of cascaded aggregation nodes is located remotely from the first host device.

3. The method of claim 1, wherein the first host device is communicatively coupled to only one end of the cascaded topology of the plurality of cascaded aggregation nodes.

4. The method of claim 1, wherein the first host device is communicatively coupled to each end of the cascaded topology of the plurality of cascaded aggregation nodes.

5. The method of claim 4, wherein one or more of the plurality of cascaded aggregation nodes is configured to switch direction of communication with the first host device through the cascaded topology of the plurality of cascaded aggregation nodes in response to a communications fault within the cascaded topology.

6. An apparatus, comprising:

a first host device;

a second host device;

a plurality of cascaded aggregation nodes; and a plurality of network links communicatively coupling the plurality of cascaded aggregation nodes to adjacent other one or more nodes of the plurality of cascaded aggregation nodes to form a cascaded topology, and communicatively coupling the plurality of cascaded aggregation nodes to the first host device and to the second host device; and the first host device and the second host device negotiate with one another to determine which of the plurality of cascaded aggregation nodes should communicate with which host device, the first host device or the second host device;

wherein the apparatus is configured to operate as two different logical packet switching devices including a first packet switching device and a second packet switching device, with the first packet switching device including the first host device and one or more of the plurality of cascaded aggregation nodes, and the second packet switching device including the second host device and one or more of the plurality of aggregation nodes; and wherein each of the first packet switching device and second packet switching device is represented to external devices as a different single packet switching device in contrast to multiple devices (a) for management purposes, and (b) for switching or routing purposes.

7. The apparatus of claim 6, wherein one or more of the plurality of cascaded aggregation nodes is configured to switch from communicating with the first host device to communicating with the second host device or from communicating with the second host device to communicating with the first host device in response to a communications fault in said cascaded topology of the plurality of cascaded aggregation nodes.

8. The apparatus of claim 6, wherein at least one of the plurality of cascaded aggregation nodes is located remotely from both the first and second host devices.

9. The method of claim 1, comprising: for at least one of said particular nodes of the plurality of cascaded aggregation nodes: appending an identification of the particular node to a path list within the initialization packet, and sending from the particular node the initialization packet with said appended path list to a next adjacent node of the plurality of cascaded aggregation nodes in a direction away from the first host.

10. The method of claim 9, further comprising:
receiving, from another node of the plurality of cascaded aggregation nodes or the first host device, a second initialization packet for configuring communication with the first host device; and
disregarding the second initialization packet by not establishing a second communications session between the particular node and the first host device in response to determining that the second initialization packet corresponds to a path from the first host device in the same direction from the first host device.

11. The method of claim 9, wherein the first host device is communicatively coupled to both ends of the cascaded topology; and wherein the method further comprises:
receiving, from another node of the plurality of cascaded aggregation nodes or the first host device, a second initialization packet for configuring communication with the first host device; and
in response to determining that the second initialization packet corresponds to a different direction path through the cascaded topology than the direction corresponding to the initialization packet, appending an identification of the particular node to a path list within the second initialization packet to create a next second initialization packet, sending from the particular node the next second initial packet towards the first host device in the direction corresponding to the second initialization packet; and establishing a second communications session between the particular node and the first host device through the path taken by the initialization packet from the first host device to the particular node.

* * * * *